US010004356B1

(12) United States Patent
Bourgeois et al.

(10) Patent No.: US 10,004,356 B1
(45) Date of Patent: *Jun. 26, 2018

(54) OUTDOOR COOKING APPARATUS

(71) Applicant: METAL FUSION, INC., Jefferson, LA (US)

(72) Inventors: Norman R. Bourgeois, Jefferson, LA (US); Michael P. Bourgeois, Kenner, LA (US)

(73) Assignee: Metal Fusion, Inc., Jefferson, LA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/437,218

(22) Filed: Feb. 20, 2017

Related U.S. Application Data

(63) Continuation of application No. 12/853,719, filed on Aug. 10, 2010, now Pat. No. 9,572,455, which is a continuation of application No. 11/771,309, filed on Jun. 29, 2007, now Pat. No. 7,770,514, which is a continuation of application No. 10/862,553, filed on Jun. 7, 2004, now Pat. No. 7,237,476.

(60) Provisional application No. 60/479,198, filed on Jun. 17, 2003.

(51) Int. Cl.
| | |
|---|---|
| *A47J 36/26* | (2006.01) |
| *A47J 36/20* | (2006.01) |
| *A47J 37/07* | (2006.01) |
| *A47J 37/12* | (2006.01) |

(52) U.S. Cl.
CPC ............ *A47J 36/26* (2013.01); *A47J 36/20* (2013.01); *A47J 37/0763* (2013.01); *A47J 37/1247* (2013.01); *A47J 37/1295* (2013.01)

(58) Field of Classification Search
CPC .............................. A47J 37/0763; A47J 36/26
USPC ...................................................... 126/25 R
See application file for complete search history.

(56) References Cited

U.S. PATENT DOCUMENTS

| 4,787,301 | A | * | 11/1988 | Hoatson | A47J 37/12 219/422 |
|---|---|---|---|---|---|
| 5,518,127 | A | * | 5/1996 | Warmack | A47F 9/00 108/25 |
| 5,813,321 | A | * | 9/1998 | Bourgeois | A47J 27/04 99/340 |
| 6,732,636 | B1 | * | 5/2004 | Germano | A47J 36/22 99/403 |
| 7,325,482 | B1 | * | 2/2008 | Bourgeois | A47J 27/00 99/340 |

* cited by examiner

*Primary Examiner* — Avinash Savani
*Assistant Examiner* — Aaron Heyamoto
(74) *Attorney, Agent, or Firm* — Brett A. North

(57) ABSTRACT

An improved outdoor cooking apparatus features a pot with multiple cooking inserts and burner frame that supports a burner element. One insert can be used for cooking an entire poultry carcass. Other inserts are perforated baskets that can be used to fry items.

17 Claims, 6 Drawing Sheets

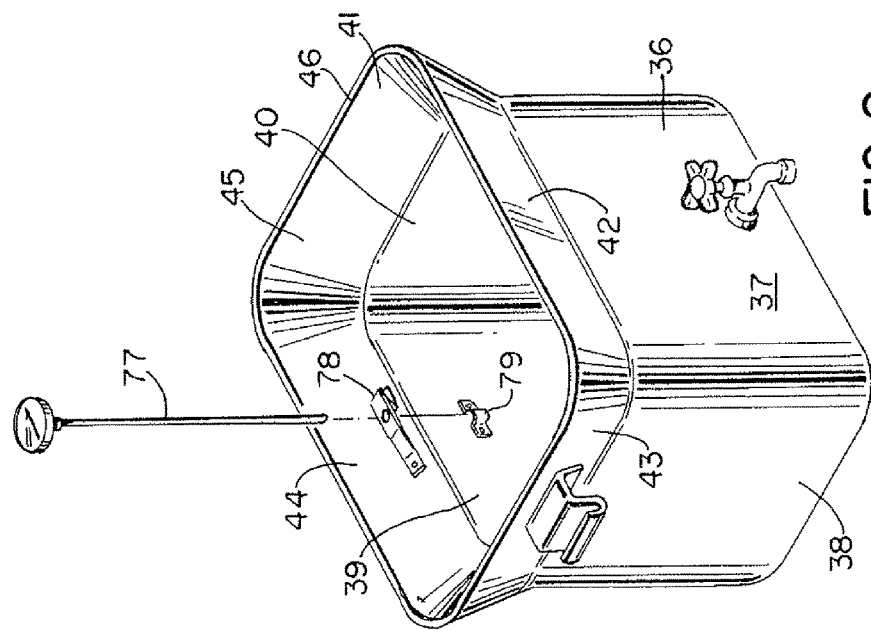
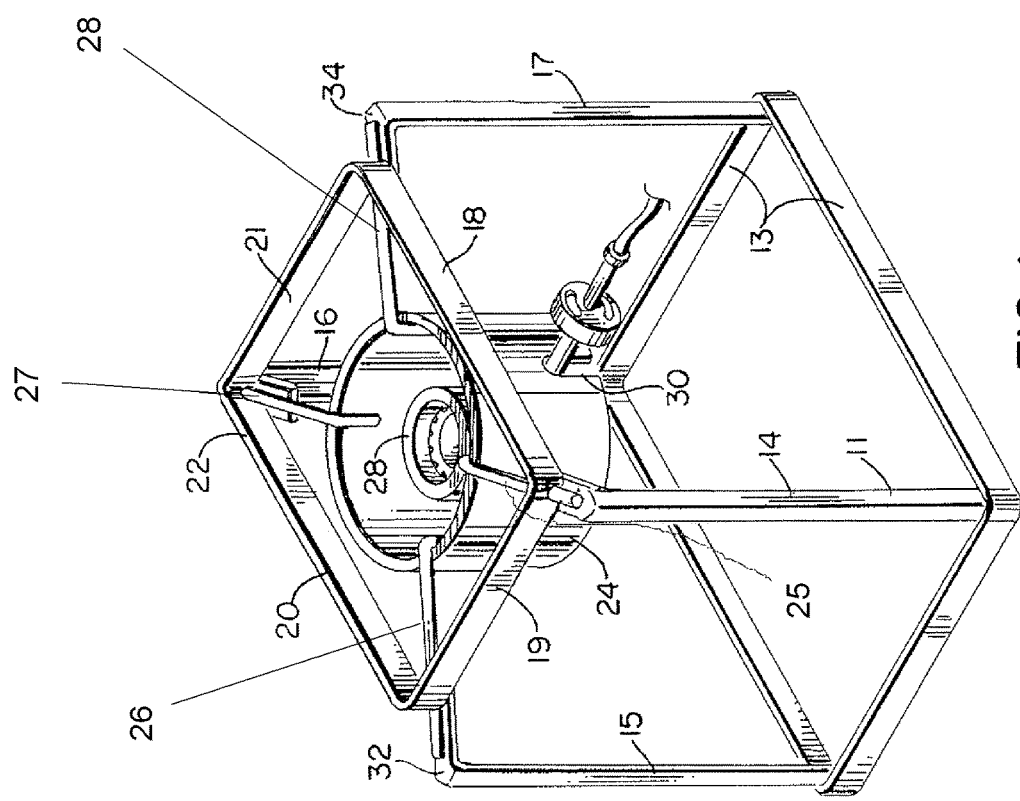

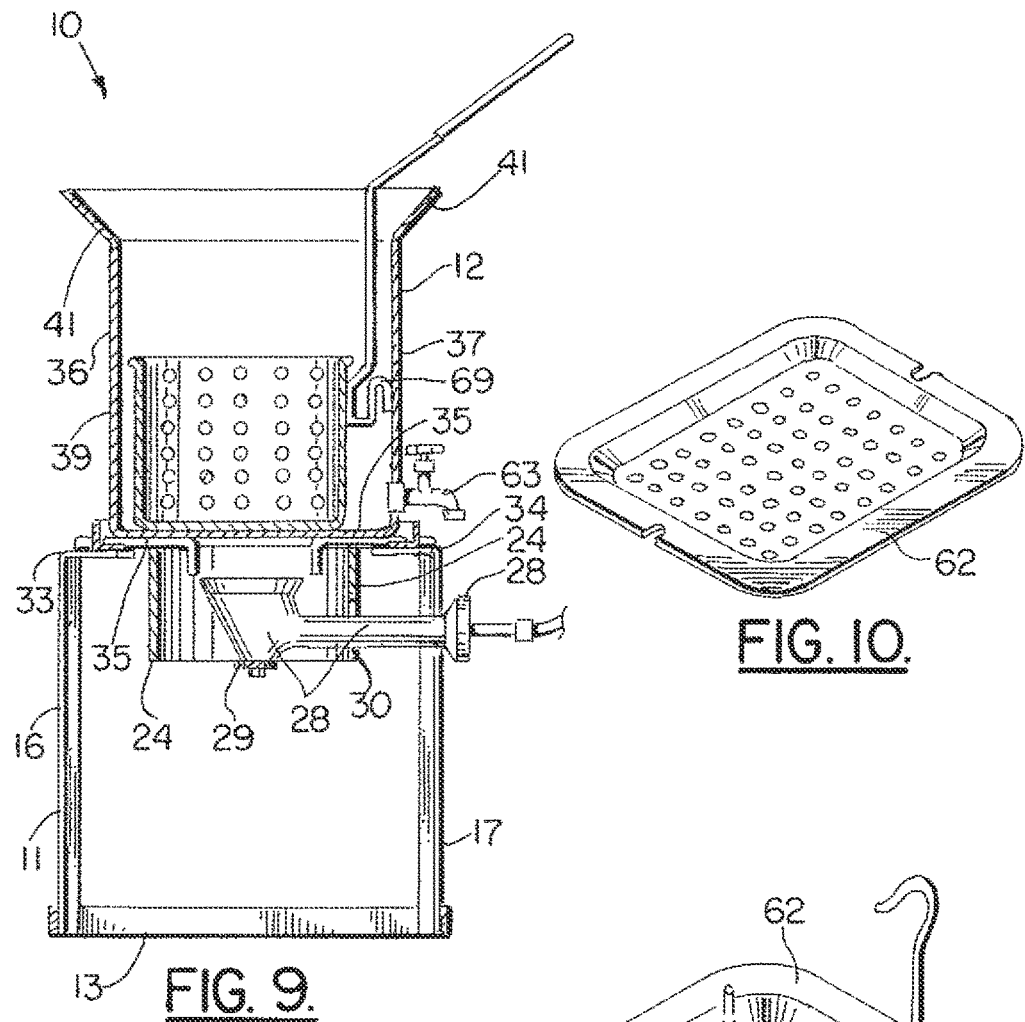
FIG. 9.
FIG. 10.
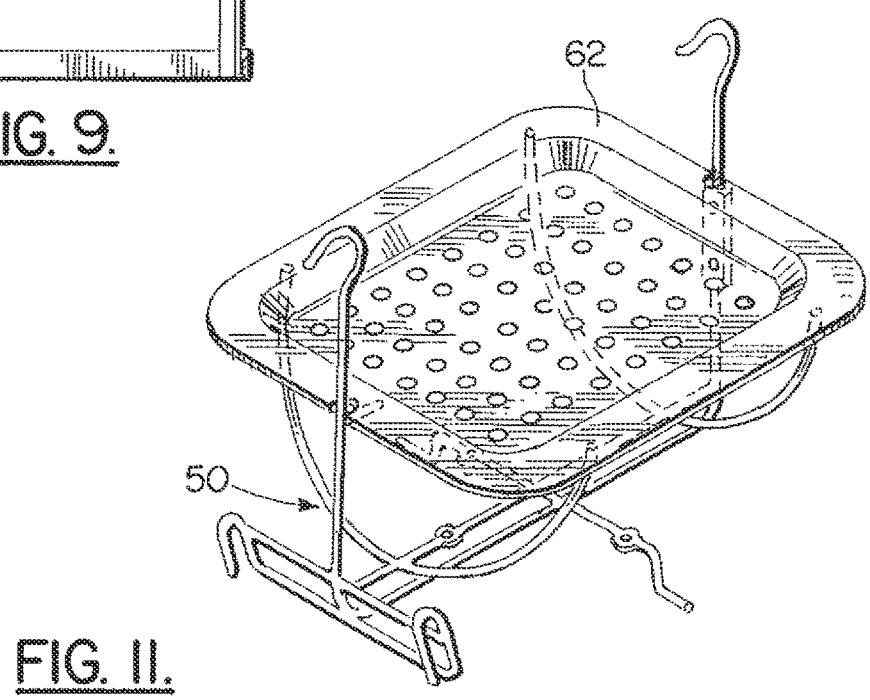
FIG. 11.

OUTDOOR COOKING APPARATUS

CROSS-REFERENCE TO RELATED APPLICATIONS

This is a continuation of U.S. patent application Ser. No. 11/771,309, filed Jun. 29, 2007 (issuing as U.S. Pat. No. 7,770,514 on Aug. 10, 2010), which is a continuation of U.S. patent application Ser. No. 10/862,553, filed Jun. 7, 2004 (now U.S. Pat. No. 7,237,476), which is a nonprovisional of U.S. Provisional Patent Application Ser. No. 60/479,198, filed Jun. 17, 2003, each of which are hereby incorporated herein by reference, and priority of each is hereby claimed.

Priority of U.S. Provisional Patent Application Ser. No. 60/479,198, filed Jun. 17, 2003, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to outdoor cooking devices that are fueled with gaseous fuel (e.g. propane, butane) and more particularly to an improved outdoor cooking device that can be used in a number of different cooking situations including boiling, steaming, and with water or oil as a cooking medium. Even more particularly, the present invention relates to an improved cooking apparatus that has a specially shaped pot and multiple food holding inserts that can optionally be placed inside the pot. The inserts include one or more perforated pans for frying food items such as fish, poultry, or vegetables and wherein a specially configured insert can hold one or more entire poultry carcasses.

2. General Background of the Invention

A number of outdoor cookers have been sold commercially for a number of years and are admitted as "prior art" type burners. These "prior art" burners have traditionally included a metallic frame that supports a burner nozzle, such as a cast iron burner nozzle. Such burner nozzles are commercially available and are used to fire most natural gas fired hot water heaters.

Examples of these prior art type outdoor cooking devices can be seen in the Jan. 1, 1996 brochure of Metal Fusion, Inc., of Jefferson, La. Patents have issued naming Norman Bourgeois as inventor that relate to burners and related cooking apparatus. Examples include U.S. Pat. No. 5,065,735 for a "Convertible Burner Apparatus" that features different primary burner frames and legs that can elevate the burner frames. Other Bourgeois patents that relate to cooking devices include the aforementioned patent and U.S. Pat. Nos. 5,813,321; 5,970,852; and 6,058,830, each said Bourgeois patent hereby incorporated herein by reference.

The burner nozzle can be a cast iron hot water heater type burner nozzle or a jet burner arrangement that uses a single outlet centered in a cylindrically-shaped, vertically oriented metallic tube. The most common version of the prior art "jet burner" arrangement is seen in Metal Fusion's catalog as Model No. 90PK. Another version of this type of cooker includes two spaced apart circular rings connected with struts and having a cylindrically-shaped wind guard or shroud. This type of prior art burner can be seen for example as Metal Fusion Model Nos. 82PK, 83PK, 85PK, 86PK, and 86PKJ.

For cooking some food items such as poultry items, it is sometimes desirable to fry the object in a basket that can be lifted from the pot. An example of this type of "prior art" arrangement is seen in the 1996 Metal Fusion catalog as Model No. 32TPK. For a combination cooking arrangement that includes a burner, pot and liner, the user typically places the poultry item in the basket and lowers it into boiling oil using a bail. In the prior art, bails have often been detachable from the basket so that the user can lower the basket into the pot and the contained boiling oil and then remove the handle or bail therefrom. This allows the user to eliminate the transfer of heat from the basket to the handle during the elongated cooking process.

A number of patents have issued that relate to cooking devices and utensils for use in combination with cooking vessels. The Walker U.S. Pat. No. 4,735,135 provides a utensil assembly and kit including same for cooking vessels used in preparing and supporting combustibles above the bottom of the cooking vessel and away from its inner walls. The utensil kit comprises a base supported above the bottom of the cooking vessel, a plurality of support attachments separately detachable and interchangeably mountable on the base for supporting selected combustible products, and releasable latch mechanism having two parts, one part disposed on the base, and the other part is disposed on each of the support attachments for engaging the base. One of the utensils is a poultry support attachment that fits inside the cavity of a chicken or other poultry enabling it to be positioned upright.

The Rappaport U.S. Pat. No. 3,053,169, discloses a poultry supporting device that sits upon a base in the form of a pan.

A rotisserie cooking arrangement is disclosed in the French Patent 2685862.

A roasting support for fowl is disclosed in U.S. Pat. No. 5,106,642. The apparatus includes a longitudinally extending rod that extends through the center of the turkey having an eyelet at its upper end.

A roaster for poultry and meat is disclosed in U.S. Pat. No. 5,301,602. The apparatus includes a vertical roasting apparatus wherein a predetermined amount of liquid for generating the moisture required to produce a high quality and flavorful roasting of the meat is included in a reservoir formed within the support structure itself and disposed internally of the poultry or meat being roasted.

A vertical spit for displaying roasting or warming is disclosed in U.S. Pat. No. 5,442,999.

A combination outdoor cooker and smoker is disclosed in U.S. Pat. No. 5,531,154. The apparatus includes a cooker having a gas burner coupled to an external gas source through a control valve by a gas supply conduit.

An Austrian patent 217592 discloses a cooking device that has a central member upon which a turkey or chicken is supported during the cooking operation.

British patent 2205734A discloses a device for use in preparing and cooking kebabs that includes walls which are interconnected to define a tube member and into which a first end wall is slidably received to further reinforce the shape formed by the sidewalls and whose end position is determined by the engagement of lips projecting inwardly from the sidewalls. The sidewalls are apertured longitudinally for receiving a knife to cut food within the tube member.

Issued patents to Barbour (U.S. Pat. Nos. 5,758,569 and 5,896,810) disclose a cooking apparatus directed to the frying of poultry items such as turkeys.

Several patents have issued that are directed to a cooker or pot having a spigot provided on the pot wall that enables liquid to be withdrawn from the pot via the spigot. An example of such an early patent is the Saroni U.S. Pat. No. 57,577 entitled "Apparatus for Steaming Vegetables." In the Saroni 577 patent, a spigot B is provided for withdrawing liquid from the receptacle or pot.

The Paterson U.S. Pat. No. 74,123 discloses in FIG. 1 a spigot mounted on the wall of a pot.

The Durham U.S. Pat. No. 123,876 discloses a boiler (see FIGS. 1 and 3) in the form of a pot having handles and a lid H. The Durham '876 patent states that one or more of the lower components are using for cooking solids, and the others are either for soup or other liquid, the latter C or either of them being provided with a tap D at the bottom for drawing off the contents.

The Goodwyn U.S. Pat. No. 159,755 provides a cooking vessel. A faucet B is provided at the lower end of the boiler A.

The Harper U.S. Pat. No. 1,054,114 discloses a furnace that includes a vat that can be fastened to the top of the fire box by means of a sleeve D formed integral therewith and adapted to fit over the smoke pipe E. This vat is provided with a cover D' and also an outlet pipe E having a spigot E'.

A cooking vessel is disclosed in the Clayton U.S. Pat. No. 1,272,222 that includes a cooking vessel 10 having an outlet nipple 11 in which is rotatably mounted on a valve plug 12. This valve structure enables the liquid to be easily drawn off.

The Jobe U.S. Pat. No. 1,390,908 discloses a cooking vessel that has an outer pipe 20 that has one end communicating with the inner receptacle for drawing liquids therefrom, the pipe extending through the outer receptacle and equipped with a valve 21.

The Austin U.S. Pat. No. 1,827,131 provides a pot drain in the form of pipe 12 that is fitted with a cap 13.

The Baker U.S. Pat. No. 2,350,335 discloses a brewer or cooker that has a drain valve 7 adjacent its lower end through which brewed coffee may be withdrawn.

The Shipman U.S. Pat. No. 3,838,680 discloses a combination heating and serving assembly having a drainage outlet or spigot 32 by which the liquid contents of the container may be drawn off from time to time.

BRIEF SUMMARY OF THE INVENTION

The present invention provides an improved outdoor cooking apparatus that includes a burner frame having upper and lower end portions, wherein the lower end portion is configured to engage an underlying support surface, the upper end portion providing a pot support.

A burner element is mounted on the frame for providing a flame to be used during cooking. A pot rests upon the pot support during cooking, the pot having a generally square or rectangular bottom panel, a plurality of side walls, an open top, a pot rim, and an interior for holding a cooking fluid.

One or more inserts or racks are provided that are sized and shaped to fit the pot interior. Each insert or rack optionally rests upon the pot bottom panel in a cooking position and can be attached to the pot rim in a draining position. One of the racks is a poultry cooking insert that can hold an entire poultry carcass (for example turkey, chicken, or a plurality of poultry carcasses).

Another rack that can be placed in a cooking medium within the pot interior is a perforated basket for frying items such as fish, poultry, vegetables or the like. In a preferred embodiment, two frying baskets can be placed inside the pot in a side-by-side position or configuration.

The apparatus of the present invention can be used to steam items when a steamer plate is placed above and supported by the poultry cooking insert.

The present invention can be used with more than one cooking medium, such as with oil or with water. Water is preferably used when steaming, or when cooking certain seafood items that are boiled such as shrimp or crabs. An oil cooking medium is used when frying certain items such as poultry, fish, or vegetables.

BRIEF DESCRIPTION OF THE DRAWINGS

FIG. 1 is a partial perspective view of a preferred embodiment of the apparatus of the present invention showing the burner, FIG. 2 is a partial perspective view of a preferred embodiment of the apparatus of the present invention showing the pot;

FIG. 9 is a sectional, elevation view of a preferred embodiment of the apparatus of the present invention illustrating the pot and food holding basket insert in a cooking position;

FIG. 10 is a partial perspective view of a preferred embodiment of the apparatus of the present invention illustrating the steamer plate; and FIG. 11 is a partial perspective view of a preferred embodiment of the apparatus of the present invention illustrating the poultry cooking insert and steamer plate.

DETAILED DESCRIPTION OF THE INVENTION

Figure 3:
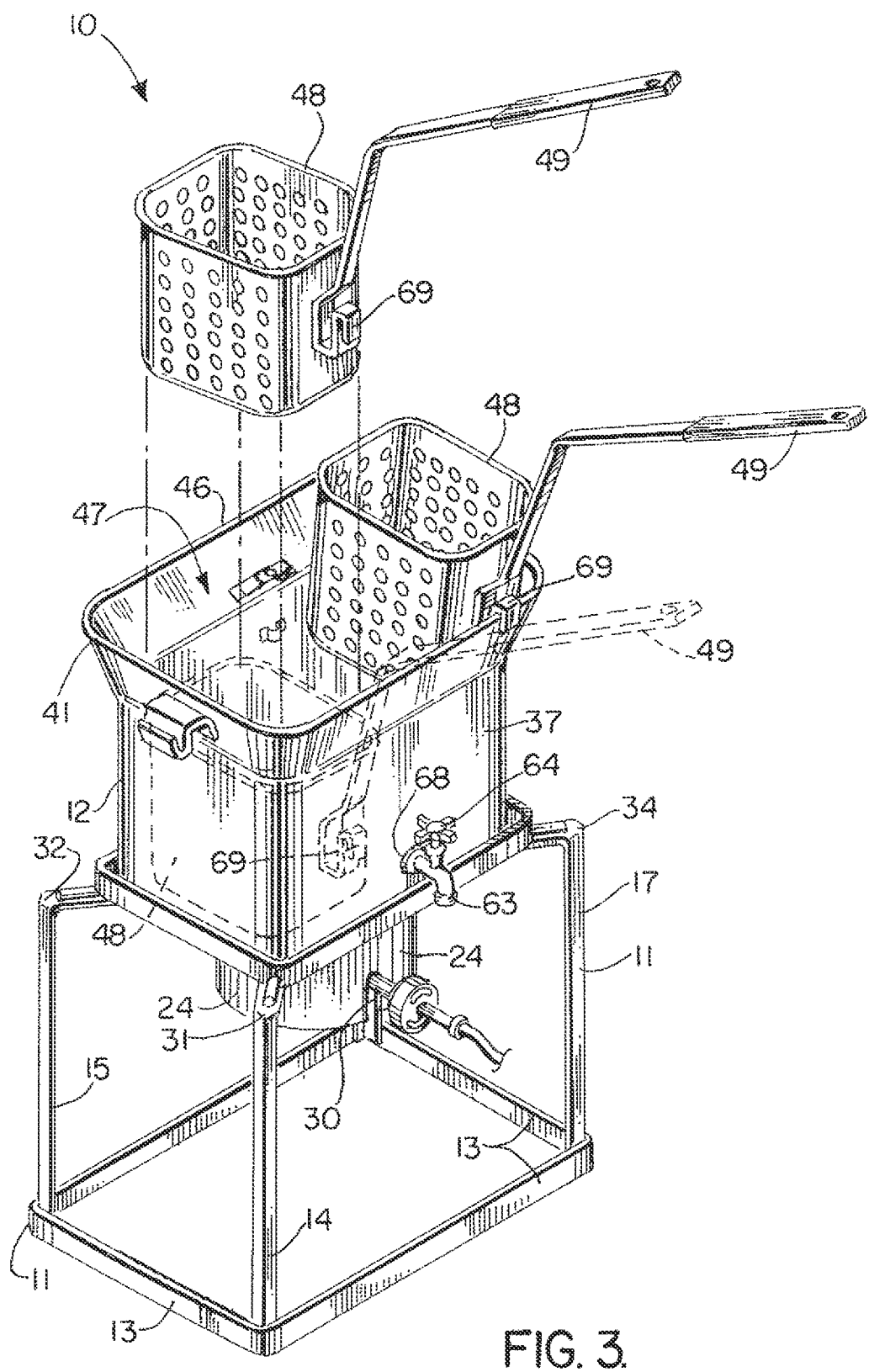
FIG. 3 is a perspective view of a preferred embodiment of the apparatus of the present invention.
Figure 8:
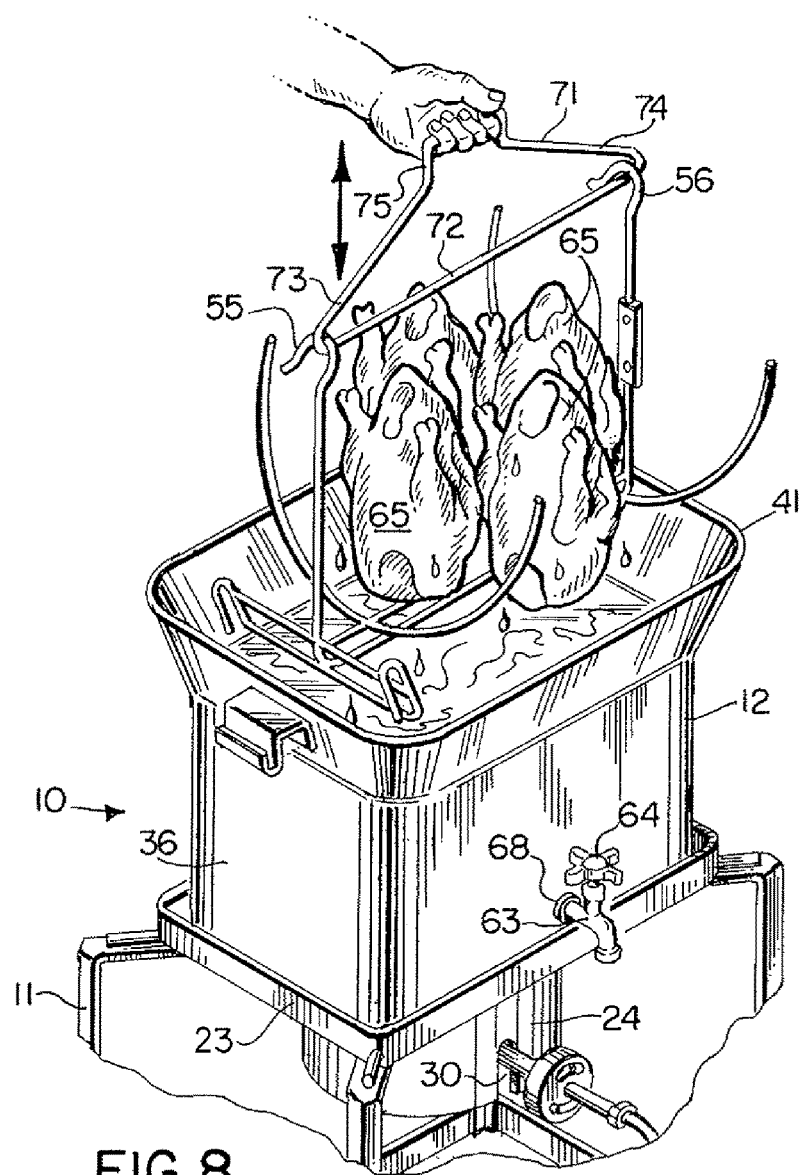
FIG. 8 is a partial perspective view of a preferred embodiment of the apparatus of the present invention illustrating pot, burner, and insert.

FIGS. 3, 8, and 9 show a preferred embodiment of the apparatus of the present invention, designated generally the numeral 10. Outdoor cooking apparatus 10 includes a burner frame 11 that supports a pot 12. The burner frame provides a generally rectangular base 13 that can be in the form of a square or rectangular member. A plurality of legs 14, 15, 16, 17 extend upwardly along the generally vertical path from base 13 to a pot support 23 that can be comprised of a plurality of beams 18, 19, 20, 21. Each beam 18-21 includes a vertical barrier portion 22 to restrain lateral movement of pot 12. The pot 12 provides a bottom panel 35 that rests upon horizontal support surface 23. Vertical barrier 22 portion of each beam 18-21 restrains the pot 12 by engaging sidewall panels 37, 38, 39, 40 and preventing lateral movement of the pot 12 during cooking.

Frame 11 provides a shroud 24 that surrounds burner element 29 to provide a wind guard, a plurality of grate members 25, 26, 27, 28. A burner element support beam can be used to support a commercially available burner element 29 inside shroud 24. A slot 30 in shroud 24 enables a part of the burner element to exit the shroud 24 and attach to a supply of fuel such as a propane or butane tank, regulator, and supply hose. Each grate member 25, 26, 27, 28 can be welded at one end portion to a leg 14, 15, 16, 17 next to a bend 31, 32, 33, 34. At its other end, each grate member is connected (e.g. welded) to shroud 24. In this fashion, grate members 25, 26, 27, 28 function to support pot 12 and shroud 24.

It should be understood that such a gaseous fuel supply is well known in the art and typically includes a propane or butane tank, regulator and hose with appropriate fittings for interfacing between the hose and the burner element. Such burner elements are well known in the art, commercially available and can be seen in one or more of the above incorporated by reference Bourgeois patents.

Each leg 14, 15, 16, 17 has a bend 31, 32, 33, 34 respectively. This combination of the placement, spacing, and length of legs 14, 15, 16, 17 the size and shape of base 13, and the bends 31, 32, 33, 34 enable the pot 12 to be stored inside defined by base 13 and legs 14, 15, 16, 17 and under pot support 23. The overall height of pot 12 can thus be less than the height of each leg 14, 15, 16, 17. Once stored, shroud 24 is positioned inside pot 12 interior 47.

Pot 12 includes a bottom panel 35, a plurality of sidewall panels 37, 38, 39, 40 that define a lower section 36. Pot upper section 41 includes a plurality of preferably four inclined wall panels 42, 43, 44, 45.

Pot rim 46 can provide a continuous upper edge that is defined by the top of each of the inclined wall panels 42, 43, 44, 45. During cooking, any of a selected plurality of cooking inserts, baskets or racks 48, 50 can be attached to the pot rim 46 for draining excess cooking fluid (e.g. oil) from a food item. When the selected insert 48, 50 is attached to the pot rim 46, cooking fluids such as water or oil can drain back into pot 12 interior 47. A thermometer 77 can be supported with supports 78,79 so that the temperature of the cooking fluid in pot interior 47 can be monitored.

The selected inserts or racks can include the poultry cooking insert 50, or a basket (or baskets) 48 having handle 49. Handle 49 can be bent to track the shape of pot 12 wall. The uppermost end of handle 49 preferably extends above pot rim 46. In a preferred embodiment, more than one basket 48 can be provided, such as the two baskets shown in FIG. 3. Two baskets 48 can be sized and shaped to fit side-by-side within the confines of sidewall panels 37, 38, 39, 40.

The side-by-side cooking baskets 48 can occupy about the same area as steamer plate 62 or pot bottom panel 35. It should be understood that either one of or both of the baskets 48 can be removed and attached to pot rim 46 using basket hanger 69 after cooking. Hanger 69 enables a user to cook items in one basket 48 while draining items that have already been cooked and that are contained in the other basket 48.

Poultry cooking insert 50 as shown in FIGS. 4-6, 8, 11. Poultry cooking insert 50 includes one or more longitudinal beams 51 and one or more transverse beams 52. The beams 51, 52 can be welded together. At opposing end portions of longitudinal beam 51 there are provided vertical beams 53, 54 respectively, each having a lifting hook or eyelet 55 or 56.

Figure 4:
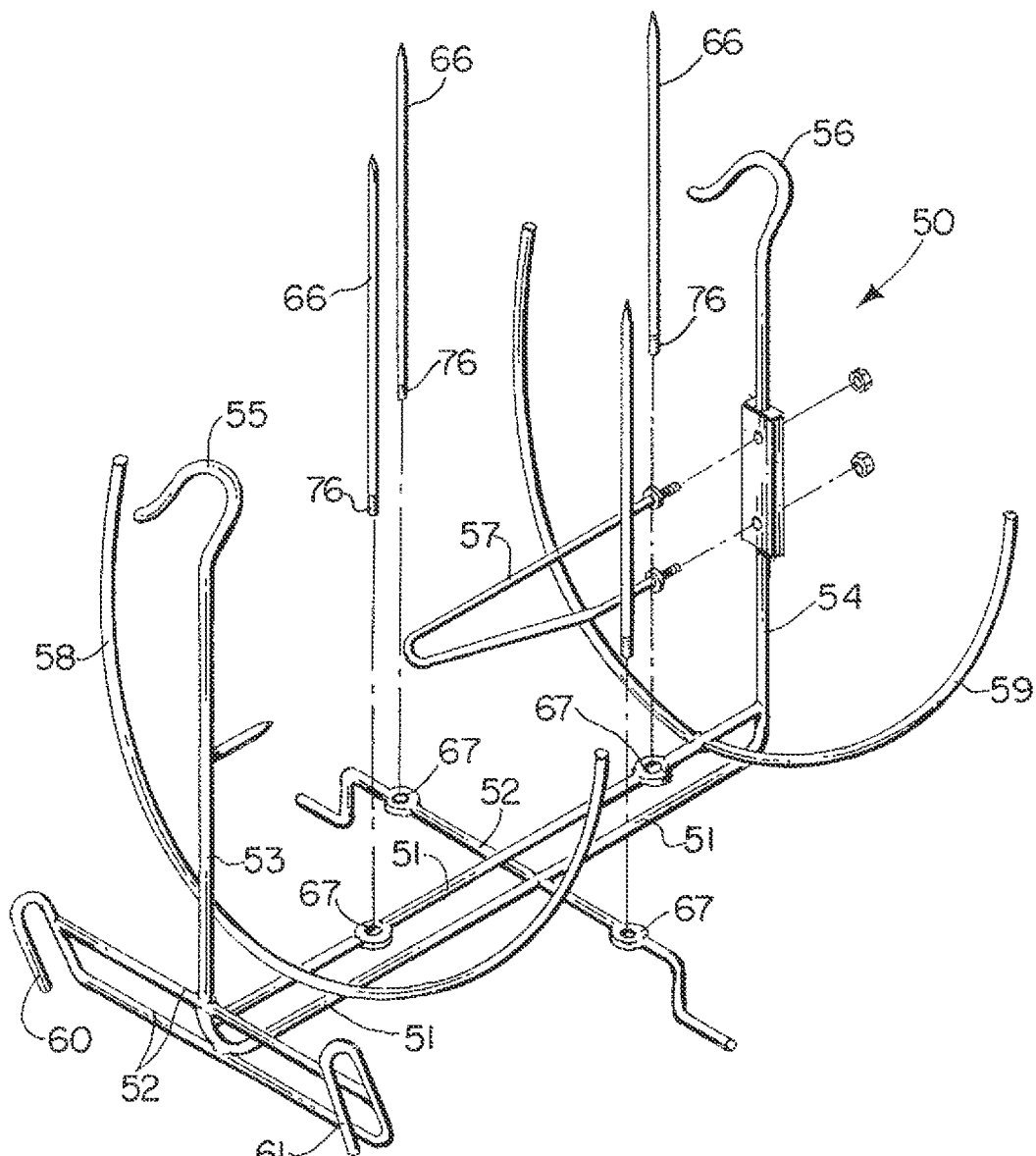
FIG. 4 is a partial perspective, exploded view of a preferred embodiment of the apparatus of the present invention illustrating the poultry cooking insert.
Figure 5:
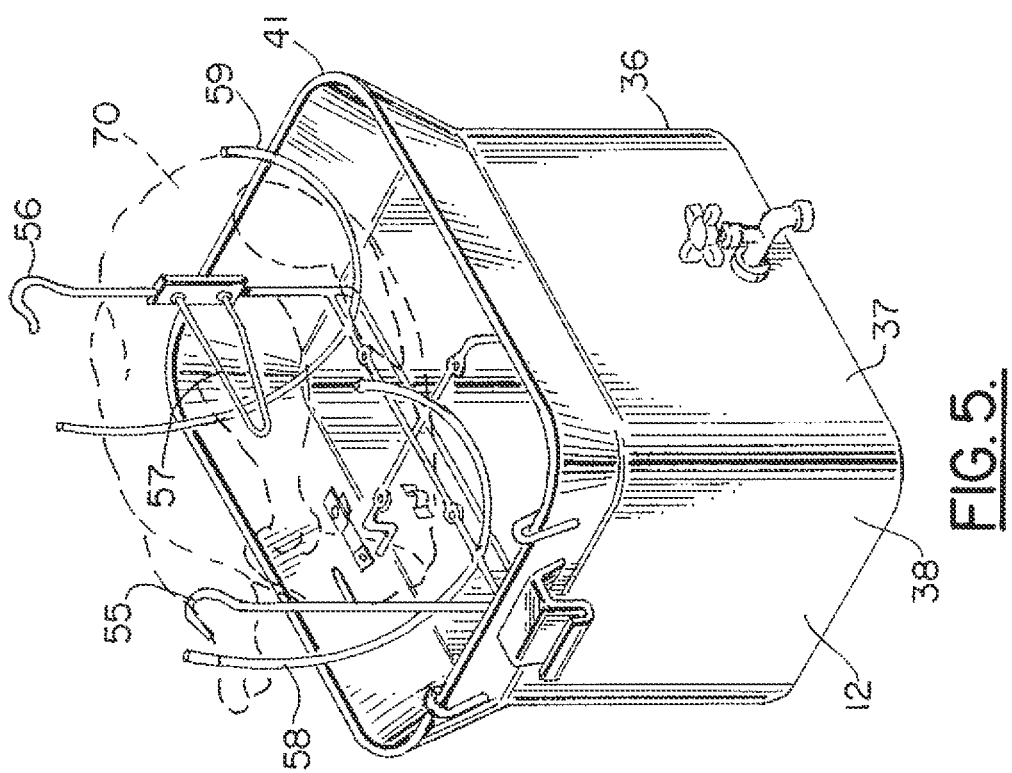
FIG. 5 is a partial perspective view of a preferred embodiment of the apparatus of the present invention illustrating the poultry cooking insert in a draining position.

Poultry skewer 57 extends from one of the vertical beams 53, 54 longitudinally, roughly parallel to the longitudinal beams 51 (see FIG. 4). One or more curved supports 58, 59 can be attached to the longitudinal beams 51 for assisting in the support of a large poultry item such as the turkey carcass 70 shown in FIG. 5. Hangers 60, 61 can be fork-shaped members that enable the poultry cooking insert 50 to be attached to rim 46 in a draining position that is shown in FIG. 5.

Figure 6:
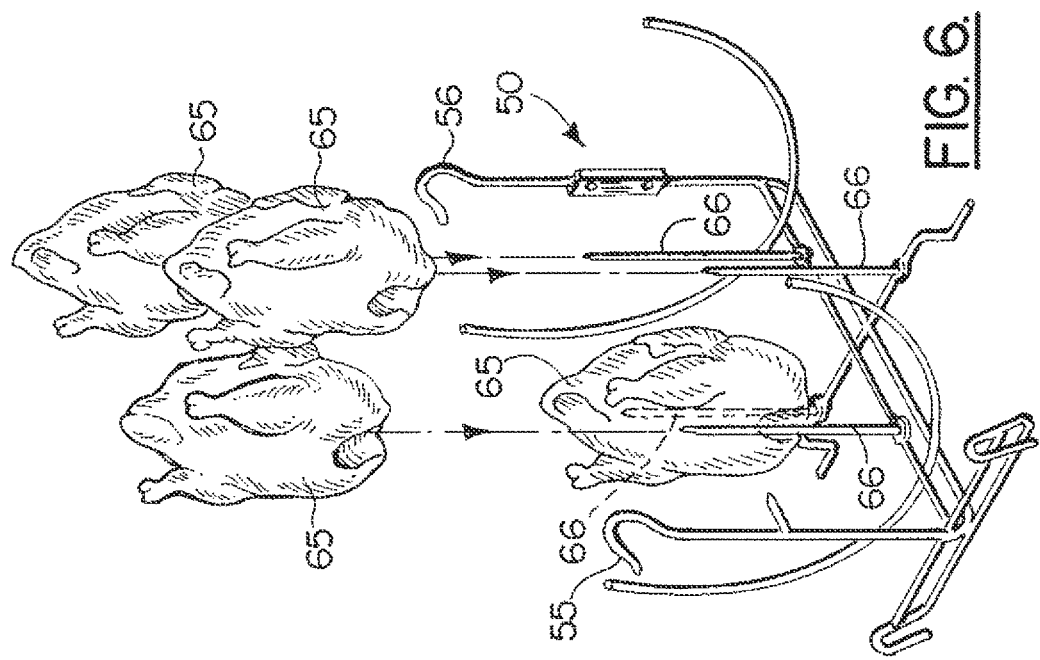
FIG. 6 is a partial perspective view of a preferred embodiment of the apparatus of the present invention illustrating the poultry cooking insert.

One or more vertical skewers 66 can be attached to beams 51, 52 for assisting in the support of one or more smaller poultry item such as the chickens 65 shown in FIG. 6. The vertical skewers 66 have external threads 76 that can be attached to the beams 51, 52 by internally threaded boss 67.

FIGS. 10 and 11 show optional steamer plate 62. In its operating position, plate 62 rests upon curved supports 58, 59. When cooking with the steamer plate 62, insert 50 is lowered into pot 12, against bottom panel 35. Water is placed in the pot 12 to a level that is just below steamer plate 62 so that boiling water can steam those food items that are placed upon steamer plate 62.

When cooking with any fluid, oil or water, spigot 63 can be used to drain pot interior 47. Spigot 63 can be a commercially available spigot having a valve handle 64 that can be opened and closed so that when opened, the contents of pot 12 drain for disposal or recycling. Spigot 63 can be attached to pot 12 using any suitable outlet fitting or connection 68 such as a welded or bolted fitting or connection. Several prior art patents disclose the concept of draining fluid from a cooking pot using a spigot.

Figure 7:
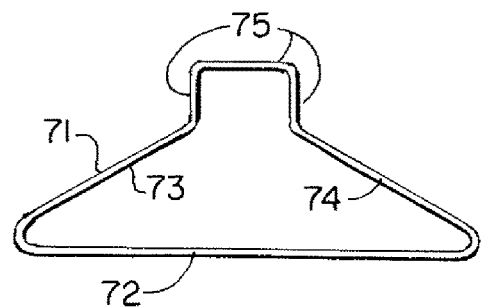
FIG. 7 is a partial perspective view of a preferred embodiment of the apparatus of the present invention showing the pot lifter.

Lifting implement 71 is shown in FIG. 7. Implement 71 can be grasped at handle 75 (FIG. 8) and attached at bar 72 to hooks 55, 56, enabling a user to engage and lift insert 50. Diagonal sections 73, 74 connect bar 72 to handle 75.

PARTS LIST

The following is a list of suitable parts and materials for the various elements of a preferred embodiment of the present invention.

| PARTS LIST | |
| --- | --- |
| Parts Number | Description |
| 10 | outdoor cooking apparatus |
| 11 | burner frame |
| 12 | pot |
| 13 | base |
| 14 | leg |
| 15 | leg |
| 16 | leg |
| 17 | leg |
| 18 | beam |
| 19 | beam |
| 20 | beam |
| 21 | beam |
| 22 | vertical barrier |
| 23 | pot support |
| 24 | shroud |
| 25 | grate member |
| 26 | grate member |
| 27 | grate member |
| 28 | grate member |
| 29 | burner element |
| 30 | slot |
| 31 | bend |
| 32 | bend |
| 33 | bend |
| 34 | bend |
| 35 | bottom panel |

-continued

PARTS LIST

| Parts Number | Description |
| --- | --- |
| 36 | lower section |
| 37 | side wall panel |
| 38 | side wall panel |
| 39 | side wall panel |
| 40 | side wall panel |
| 41 | upper section |
| 42 | inclined wall panel |
| 43 | inclined wall panel |
| 44 | inclined wall panel |
| 45 | inclined wall panel |
| 46 | pot rim |
| 47 | pot interior |
| 48 | basket |
| 49 | handle |
| 50 | poultry cooking insert |
| 51 | longitudinal beam |
| 52 | transverse beam |
| 53 | vertical beam |
| 54 | vertical beam |
| 55 | lifting hook |
| 56 | lifting hook |
| 57 | poultry skewer |
| 58 | curved support |
| 59 | curved support |
| 60 | hanger |
| 61 | hanger |
| 62 | steamer plate |
| 63 | spigot |
| 64 | valve handle |
| 65 | chicken |
| 66 | vertical skewer |
| 67 | internally threaded boss |
| 68 | outlet fitting |
| 69 | hanger |
| 70 | poultry carcass |
| 71 | lifting implement |
| 72 | bar |
| 73 | diagonal section |
| 74 | diagonal section |
| 75 | handle |
| 76 | external thread |
| 77 | thermometer |
| 78 | support |
| 79 | support |

The foregoing embodiments are presented by way of example only; the scope of the present invention is to be limited only by the following claims.

The invention claimed is:

1. An outdoor cooking apparatus comprising:
(a) a burner frame having
upper and lower end portions,
the lower end portion
being configured to engage an underlying support surface
the upper end portion
providing a pot support,
a burner element
supported by the burner frame;
(b) a pot
that rests upon the pot support during cooking,
the pot having
a bottom panel,
an exterior wall,
an open top,
the exterior wall enclosing a pot interior
for holding a cooking fluid,
the pot including an upper section and a lower section,
wherein the exterior wall is located in the lower section;
the upper section being attached to the lower section via a joint, the upper section having an expanding perimeter, wherein a generally horizontal plane intersecting the upper section at different vertical levels creates a plurality of pot interior cross sectional areas such that each of the plurality of interior cross sectional areas increase in size with increasing vertical distance above the joint;
(c) a rack sized and shaped to fit the pot interior and for supporting a food item, the rack having a central longitudinal axis, and a hanger connected to the rack, the hanger enabling the rack to be supported by the pot upper section to place the rack in a draining position,
wherein,
in a cooking position, the rack is resting in the lower section of the pot with the hanger being located below the joint, and the central longitudinal axis of the rack being substantially parallel to the bottom panel of the pot, and
wherein,
in the draining position, the hanger being connected to the upper section of the pot causing the rack to be supported by the upper section of the pot, and wherein the connection between the hanger and the upper section of the pot causes the central longitudinal axis of the rack to be in a substantially horizontal position when the hanger is connected to the upper section of the pot so that the supported food item is located in a position that does not extend below the joint.

2. The outdoor cooking apparatus of claim 1, wherein the rack has one or more arms with lifting members, and when the rack is located in the pot interior the arms extending upwardly causing the lifting members to extend to a vertical position located above the joint, and enabling the rack to be lifted by the lifting hooks.

3. The outdoor cooking apparatus of claim 1, wherein the rack has a skewer for supporting a skewered turkey carcass, and the skewer is optionally selectable to extend generally horizontally or generally vertically in the cooking position.

4. The outdoor cooking apparatus of claim 1, wherein the rack has a retainer that laterally restrains the rack when located in the pot interior.

5. The outdoor cooking apparatus of claim 1, further comprising a steamer plate that removably attaches to the rack.

6. The outdoor cooking apparatus of claim 5, further comprising a plurality of convex turkey carcass cradling supports, and the steamer plate removably attaches to the plurality of convex turkey carcass cradling supports.

7. The outdoor cooking apparatus of claim 5, wherein the steamer plate is supported above the pot bottom panel.

8. The outdoor cooking apparatus of claim 5, wherein the steamer plate has about the same dimensions as the pot bottom panel.

9. The outdoor cooking apparatus of claim 5, wherein the rack has longitudinal and transverse portions, and the hanger is attached to one of the transverse portions.

10. The outdoor cooking apparatus of claim 1, wherein the rack has a plurality of connections for a plurality of vertically oriented poultry skewers.

11. An outdoor cooking apparatus comprising:
(a) a burner frame having
upper and lower end portions,
the lower end portion
being configured to engage an underlying support surface
the upper end portion
providing a pot support, a burner element
supported by the burner frame;
(b) a pot
that rests upon the pot support during cooking,
the pot having
a bottom panel,
an exterior wall,
an open top,
the exterior wall enclosing a pot interior
for holding a cooking fluid,
the pot including an upper section and a lower section, wherein the exterior wall is located in the lower section;
the upper section being tapered outwardly having an outward taper with an expanding perimeter compared to the pot interior,
(c) a rack sized and shaped to fit the pot interior and for supporting a food item, the rack having a central longitudinal axis, and a hanger connected to the rack, the hanger enabling the rack to be supported by the pot upper section to place the rack in a draining position,
wherein,
in a cooking position, the rack is resting in the lower section of the pot with the hanger being located below the joint, and the central longitudinal axis of the rack being substantially parallel to the bottom panel of the pot, and
wherein,
in the draining position, the hanger being connected to the upper section of the pot wherein the outward taper with the expanding perimeter of the upper section of the pot causes the central longitudinal axis of the rack to be in a substantially horizontal position when the hanger is connected to the upper section of the pot so that the supported food item is located in a position that does not extend below the joint.

12. The outdoor cooking apparatus of claim 11, wherein the rack has one or more arms with lifting members, and when the rack is located in the pot interior the arms extending upwardly the causing lifting members to extend to a vertical position located above the joint, and enabling the rack to be lifted by the lifting hooks.

13. The outdoor cooking apparatus of claim 12, wherein the rack has a skewer for supporting a skewered turkey carcass in a reclined, non-vertical position in the draining position.

14. The outdoor cooking apparatus of claim 12, further comprising a steamer plate that removably attaches to the rack.

15. The outdoor cooking apparatus of claim 14, further comprising a plurality of convex turkey carcass cradling supports, and the steamer plate removably attaches to the plurality of convex turkey carcass cradling supports.

16. The outdoor cooking apparatus of claim 14, wherein the rack has longitudinal and transverse portions, and the hanger is attached to one of the transverse portions.

17. The outdoor cooking apparatus of claim 12, wherein the rack has a plurality of connections for a plurality of vertically oriented poultry skewers.

* * * * *